United States Patent [19]

Letellier et al.

[11] Patent Number: 5,574,931
[45] Date of Patent: Nov. 12, 1996

[54] INTERCONNECTION PROCESS AND SYSTEM FOR THE CONTROL OF MESSAGES IN AN ARRAY OF PROCESSORS HAVING A PARALLEL STRUCTURE

[75] Inventors: Laurent Letellier, Boulogne-Billancourt; Hassane Essafi, Orsay; Thierry Collette, les Ulis; Jean-François Larue, Viroflay; Jean-Pierre Guerin, Orsay; Jean Rebillat, Aubergenville, all of France

[73] Assignee: Commissariat a l'Energie Atomique, Paris, France

[21] Appl. No.: 311,960

[22] Filed: Sep. 26, 1994

[30] Foreign Application Priority Data

Oct. 4, 1993 [FR] France .................................. 93 11787

[51] Int. Cl.⁶ .............................. G06F 15/00; G06F 15/16
[52] U.S. Cl. ...................................... 395/800; 395/200.01
[58] Field of Search ................................. 395/820, 250, 395/200, 800, 200.01

[56] References Cited

U.S. PATENT DOCUMENTS

| | | |
|---|---|---|
| 4,816,993 | 3/1989 | Takahashi et al. . |
| 4,930,122 | 5/1990 | Takahashi et al. . |
| 5,151,900 | 9/1992 | Snyder et al. ......................... 370/94.3 |
| 5,335,277 | 8/1994 | Harvey et al. ............................. 380/20 |

FOREIGN PATENT DOCUMENTS

| | | |
|---|---|---|
| 0186150 | 7/1986 | European Pat. Off. . |
| 0281757 | 9/1988 | European Pat. Off. . |
| 2680026 | 2/1993 | France . |

*Primary Examiner*—Alyssa H. Bowler
*Assistant Examiner*—John Follansbee
*Attorney, Agent, or Firm*—Pearne, Gordon, McCoy & Granger

[57] ABSTRACT

The invention relates to a process for controlling the circulation of messages in a ring network, in which the data are consecutively supplied, which ensures a consistency of the circulating messages. It also relates to an interconnection system for performing this process. This system comprises a plurality of processors (P0, . . . , Pn) connected on a ring network by means of in each case a cell (C0, . . . , Cn) ensuring the transmission and reception of messages circulating in the ring, a reception module (R0, . . . , Rn) able to store the messages intended for the processor and a transmission module (E0, . . . En) able to store the messages to be supplied to the network.

6 Claims, 2 Drawing Sheets

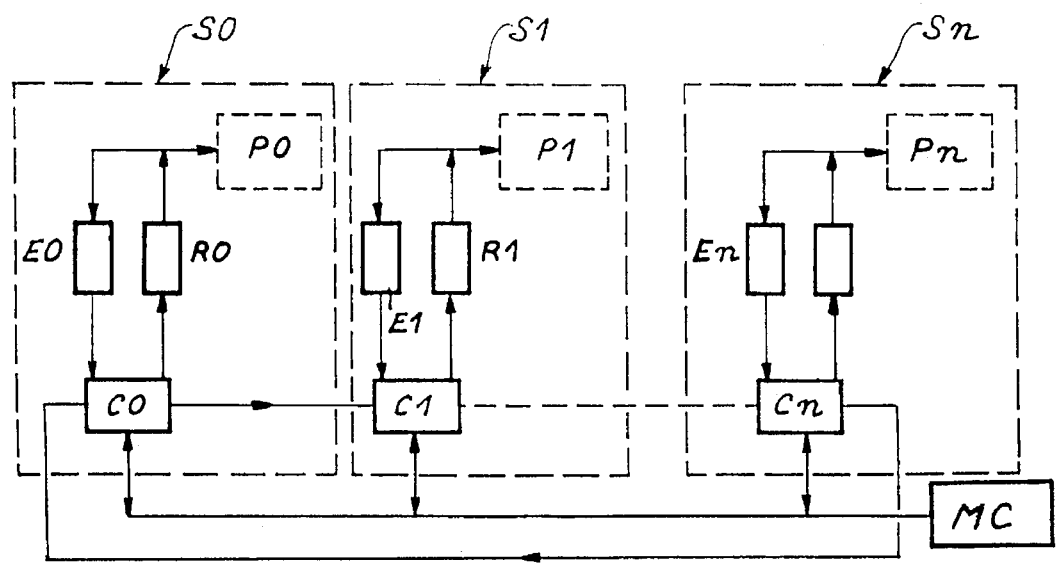
FIG. 1
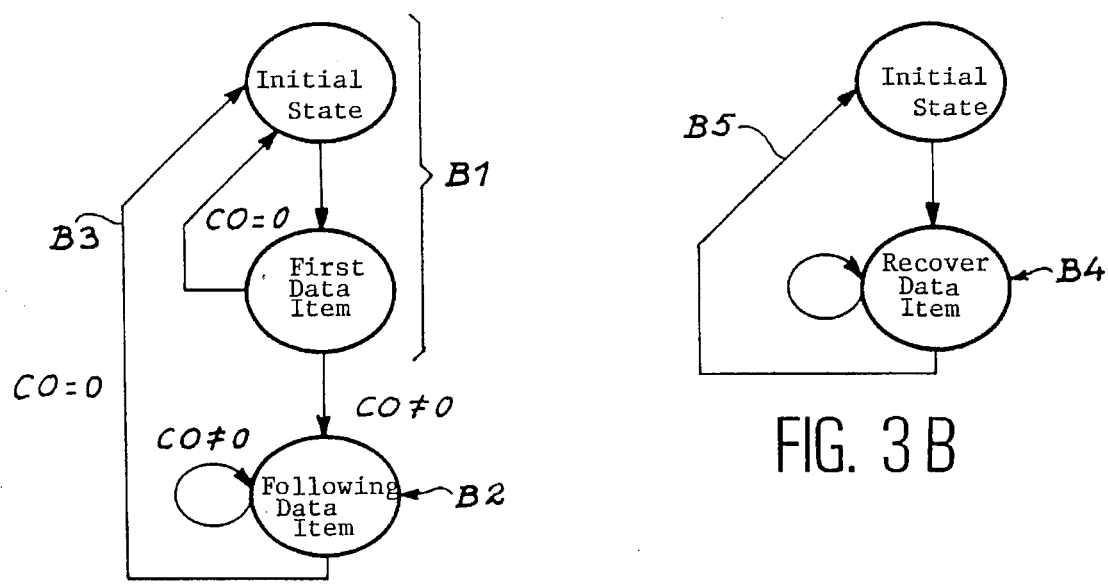
FIG. 3 A
FIG. 3 B

INTERCONNECTION PROCESS AND SYSTEM FOR THE CONTROL OF MESSAGES IN AN ARRAY OF PROCESSORS HAVING A PARALLEL STRUCTURE

BACKGROUND OF THE INVENTION

1. Field of the Invention

The present invention relates to a process for controlling or managing the circulation of messages of a same size in an array of elementary processors organized according to a parallel structure such as a structure of the SIMD type (Single Instruction Stream Multiple Data Stream). It also relates to an interconnection system for performing this process.

The invention has applications in the field of data processing. It more specifically applies to the processing of data relative to medium level pixels and to graphic generation.

2. Description of the Related Art

Among systems permitting the processing of data, there are many which do not ensure a consistency of the messages transmitted between different processors of the same array. Very frequently, when a processor supplies on the network a message having several data, the data are mixed, on reception by the receiving processor with respect to the message, with other data from messages supplied by other processors. The receiving processor must then carry out a sorting operation on the data received in order to reconstitute the messages.

During the use of massively parallel machines of the SIMD type, it is known to use as a basis regular exchanges between the processors in order to avoid such data mixing.

In the case of an application to the processing of images, these SIMD-type, massively parallel machines can ensure certain image processing levels. Thus, it is considered that the processing operations with respect to images can be classified in three levels, namely:

- a low level consisting of a processing of the image from sensors in order to deduce a filtered image therefrom;
- a medium level consisting of extracting from the filtered image symbols useful in the sequence of processing by a data transformation from an iconic format to a symbolic format;
- a high level consisting of processing these symbols and then transforming them in order to deduce therefrom the actions to be performed, said level containing the intelligence of the image processing because it in particular contains the decision taking and shape recognition algorithms.

High level processing operations are most frequently carried out by multiprocessor systems of the MIMD type (Multiple Instruction Stream Multiple Data Stream), i.e. complex structures permitting a parallelism of both the instructions and the data.

The low level processing operations are generally carried out by multiprocessor systems of the SIMD type, i.e. systems in which the processors perform at the same time the same operation on the different data.

The medium level processing operations can also be performed by a SIMD multiprocessor system. Such a system is connected to a communications network or interconnection system ensuring numerous exchange types between the different processors of the system. It more particularly ensures the intercommunication of each processor to any random other processor, the communication from one processor to all the other processors, and the communication of all the processors to a single processor. Thus, it ensures a data distribution making it possible to effectively manage the available resources, namely the elementary processors of the system. In the medium level image processing operation, each processor can be associated with one pixel of an image or picture, or with a group of pixels, and can have access to adjacent pixels by means of interconnection links of the system. According to this system, the processors are organized in a parallel structure and all processors wishing to carry out a processing operation perform the same processing operation at the same time. Such an interconnection system is described in French patent application 2,680,026.

These massively parallel systems are generally used on square, rectangular, hexagonal or hypercube mesh networks and only such network classes provide a sufficiently simple electronics system to implement architectures with a high degree of parallelism. However, on such networks, the inter-processor links are static and scarcely permit irregular communications between the processors as a result of the synchronism of their operation. Moreover, in order to retain a simple management of these interconnection systems, the efficiency of the network is frequently satisfied in order to obtain data consistency.

SUMMARY OF THE INVENTION

The present invention aims at obviating this disadvantage and, to this end, proposes a process for controlling the access priority to the network and an interconnection system implementing said priority management on transmission.

More specifically, the present invention relates to a process for the control of messages circulating in a ring network of elementary processors organized in accordance with a parallel structure and able to process, per cycle, messages of the same size, each of these processors being connected to the network by means of an interconnection module, wherein in that a question of priorities of interconnection modules for transmission and for reception of messages is established by the circulation of tokens in the network and in that one size of messages to be transmitted on the network is specified prior to the first transmission, the process comprising:

when an interconnection module receives a token, the interconnection module receives and acknowledges a first data item of the message circulating in the network if the message is intended for the elementary processor with which it is associated;

the interconnection module checks if it has sufficient memory space for storing the entire message:

if the memory space is inadequate, the interconnection module returns the message to the network, if the memory space is adequate, the interconnection module stores the first data item of the message and then all the successive data items until it detects an end of the message;

if the elementary processor has a message to be sent, the elementary processor checks that the interconnection module has an adequate memory space for completely storing the message to be sent:

if at least one message has been stored, the interconnection module supplies the first data item of the stored message to the network and then all the successive data items of the stored message;

if no message has been stored, the interconnection module waits until it receives a following token.

Prior to the first transmission of messages on the network, each elementary processor transmits a token or badge if it verifies the equations:

$$(NPE \bmod TMESS) = 0$$

and $$(N-NPE) \geq TMESS,$$

with NPE between 0 and N−1 and in which TMESS is the size of the messages to be transmitted, NPE an elementary processor number in the network and N the total number of elementary processors connected to the network.

The invention also relates to an interconnection system implementing the aforementioned process and which comprises:

- a plurality of elementary processors able to perform asynchronous processing operations, organized in accordance with a parallel structure and communicating with one another in a synchronous manner; and
- a plurality of interconnection modules, each interconnection module being associated with an elementary processor in order to ensure the connection of said elementary processor to the network, wherein each interconnection module comprises:

- a cell connected to the cells of adjacent processors and ensuring, when a token is present, on the one hand the reception of the first data item of the message circulating in the network and intended for the elementary processor with which it is associated, and on the other hand, the transmission of the message which the processor wishes to send to the network;
- a reception module connected between the cell and the elementary processor and ensuring the storage of complete messages received by the cell and intended for the elementary processor;
- a transmission module connected between the elementary processor and the cell and ensuring the storage of complete messages which the elementary processor wishes to send to the network.

Advantageously, each transmission module incorporates a memory able to store each of the messages to be transmitted and a logic circuit able to determine whether the memory is empty or not empty, full or not full.

In the same way, each reception module incorporates a memory able to store each of the messages received and a logic circuit able to determine whether the memory is full or not full, empty or not empty.

According to an embodiment of the invention, the interconnection system incorporates a central control module connected to the network by means of a cell and managing the sequencing of the network.

According to another embodiment, the interconnection system incorporates a central control module connected to each of the cells and connected to the network by means of a supplementary cell, which initializes the tokens at the start of a cycle.

According to an application of the invention, the interconnection system can be used for medium level image processing.

BRIEF DESCRIPTION OF THE DRAWINGS

The present invention will be hereafter described with reference to the drawings, wherein:

FIG. 1 shows the basic diagram of the interconnection system according to the invention.

FIGS. 3A and 3B show the state diagrams, respectively during the transmission of a message and the reception of a message.

DETAILED DESCRIPTION OF THE PREFERRED EMBODIMENT

Figure 2:
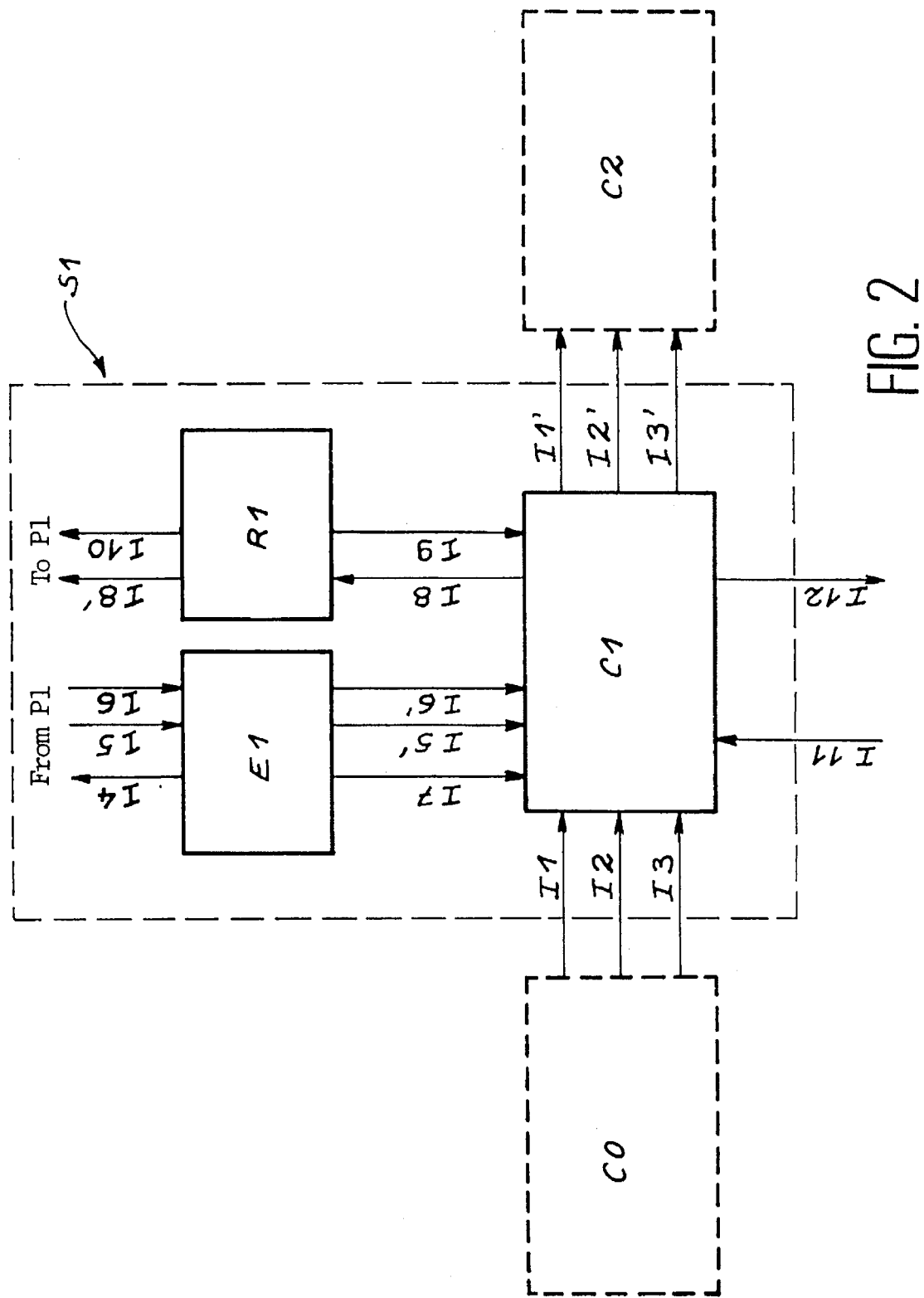
FIG. 2 diagrammatically shows an interconnection module with its inputs and outputs ensuring the link between the associated processor and the network.

FIG. 1 is the basic diagram of the interconnection system according to the invention and which can also be called an "intelligent network" or "ring network". This interconnection system comprises a plurality of stations, also known as "nodes", and each having a processing unit and an interconntion module having a cell and two modules, namely a message reception module and a message transmission module. These stations are interconnected so as to form a loop, hence the name "ring network". This ring network functions on the principle of the circulation of tokens or badges. On the network, the basic principle used is the existence of badges or tokens, which permanently circulate on the network. In addition, each station of the network can receive or transmit a message when it is in possession of a token and if, at said time, it does not wish to transmit, it returns the token received to the network. If a station wishes to transmit a message, the station must wait to receive a token in order to return it with its informations and the address of the receiving station to the network.

According to the process of the invention, several tokens circulate simultaneously on the network. A message having several successive data items is associated with each token. Thus, in the network, there is a circulation of tokens each associated with a message, the token defining the start of the message. All the messages simultaneously circulating on the network have the same size. Moreover, for a message of size 3, one station out of three in the network receives a token. If a station receives a token with which is associated a message intended for it, the station reads the message. If the message has no information or if the station has just read this message and wishes to itself transmit a message, the station sends its message with the token on the network.

According to the example described on FIG. 1, the processing units are elementary processors, but could also be calculating units, a check or control unit, etc.

In FIG. 1, the stations are designated So, . . . , Sn and the cells C0, C1, . . . , Cn. The elementary processors associated with these cells are respectively designated P0, P1, . . . , Pn. In the same way, the reception modules associated with each cell are respectively designated R0, R1, . . . , Rn and the transmission modules associated with said cells are respectively designated E0, E1, . . . , En.

Thus, the ring network shown in FIG. 1 is constituted by an array of cells C0, C1, . . . , Cn, which are interconnected. Each cell C0, C1, . . . , Cn is connected to a reception module R0, R1, . . . , Rn and to a transmission module E0, E1, . . . , En, which are associated therewith. Each elementary processor P0, P1, . . . , Pn is connected to a transmission module and to a reception module, which are associated therewith.

For a more precise description of the network, the station S1 will be described in greater detail. It is clear that all the stations S0 to Sn are similar to said station S1.

The station S1 has a cell C1 connected to the cell C0 of the preceding station S0 in the ring and to the cell of the following station in the ring, the latter not being shown in FIG. 1 for simplification reasons. The cell C1 is itself connected to the reception module R1 to which the cell C1 transmits the messages received from the network. The reception module R1 is connected to the elementary processor P1, which reads each of the messages recorded in the reception module R1. The processor P1 is also connected to the transmission module E1 to which the processor P1 transmits the messages which it wishes to transmit. The transmission module E1 is able to store each of the messages which the processor P1 wishes to transmit on the network. Each message is stored until the cell C1 is able to transmit the message on the network.

In addition, the interconnection system incorporates a control or check unit MC directly connected to the cells C0, C1 , . . . , Cn. The control unit MC makes it possible to at least partly control or manage the circulation of tokens in the network. As the control MC unit is of known type and described in the aforementioned FR-A-2,680,026, it is not shown in the drawings and will not be described in detail.

Thus, while the cells C0, C1 , . . . , Cn and the control unit control the circulation of messages in the ring, the elementary processors P0, P1, . . . Pn can carry out other processing operations, such as low and medium level operations in the case of an application to image processing. Thus, such a network is considered to be an asynchronous sequential mode network.

According to another embodiment of the interconnection system according to the invention, a central control module MC is connected to the network via a supplementary cell inserted in the ring of the cells C0, C1 , . . . , Cn described hereinbefore. This control module MC makes it possible to inject a tokens on the network at the frequency corresponding to the size of the specified message. The control module MC controls the sequencing of the network. More specifically, the control module MC informs the processors of the state of the network. When a reception module is full, this is indicated by the reception module to the control unit, which can reroute the processors to a reading phase. In the same way, when a transmission module is full, it controls the two possible cases. Either the application makes it necessary to keep all the processors at the same iteration (e.g. working on images). It is then necessary to indicate to the control unit that performance must be suspended in order to reroute the processors to a reading phase of the reception module. The operation is resumed as soon as all the transmission modules which were full are no longer full. Or the application makes it possible for the processors to get ahead (e.g. work on lists). It is then only possible to inhibit the processor whose transmission module is full, whereas the others continue to operate. This is regulated per program and the control module does not intervene again.

According to another embodiment, the control module can indicate to the processors if data are still present in the transmission modules and the cells of the network. When reading the reception module, the processors thus know if data are still liable to arrive. This module is constituted by logic circuits or programmable components. It can be integrated in a control unit of the parallel machine.

FIG. 2 diagrammatically shows the interconnection module, also referred to as "station" S1. FIG. 2 shows the cell C1, which receives informations I1, I2 and I3 from the preceding cell in the ring, namely the cell C0. In the same way as for cell C0, the cell C1 transmits, for each shift of the network, informations I'1, I'2 and I'3 to the following cell in the network, namely cell C2. These respective informations I1, I2, I3 and I'1, I'2, I'3 correspond to the three informations forming a message circulating in the network:

the informations I3 and I'3 (e.g. coded on 32 bits) correspond to the data fields to be transmitted from one processor to another;

the informations I2 and I'2 (e.g. coded on 10 bits) correspond to the address field relative to the number of the processor for which the message is intended;

the informations I1 and I'1 (generally coded on 2 bits) correspond to the message control field indicating whether the data item is valid or not and whether a token is present.

Like all the other cells of the network, the cell C1 is responsible for the transmission, reception and transfer of messages to other cells. The cell C1 determines whether a message can be transmitted on the network as a function of the presence of a token and as a function of the information considered valid or not (information I1 or I'1). The cell C1 could insert the message in the network only if the message is complete in the transmission module E1. In addition, the cell C1 verifies if a message is intended for the processor P1 with which it is associated. This verification is carried out by checking the address contained in the information I2. The presence of the token (information I1) is indispensable for recovering the message from the cell C0. Moreover, the cell C1 must ensure, in the case where a token is present, that the reception module R1 has adequate memory space in order to introduce into it the message received for storage purposes. If the reception module R1 is considered to be full, i.e. does not have sufficient space for storing the complete message, the cell C1 returns the message which continues to circulate in the network and which will be read as soon as the reception module R1 is considered not to be full. When the data item contained in the message (information I3) has been read, the cell C1 invalidates the data item. In the case where a message received by the cell C1 is not intended for the processor P1 with which it is associated, the cell C1 transmits the message to the neighboring cell C2 at the following clock time.

Thus, in this interconnection system the cells behave like a vast shift register and thus transmit the messages in a gradual manner.

Directly from the processor each cell receives a token insertion or elimination information I11 at the instant of the initialization phase described hereinafter. It also supplies the control module with an information I12 relative to its state (empty or full), so that the control module can inform the processors when a complete cycle is finished. A new cycle with a new message size can then be implemented.

The transmission module E1 receives from the elementary processor P1 (not shown in the drawing for simplification reasons), the informations to be supplied to the network. These informations incorporate a data field I6 and an address field having the number of the receiving processor I5. If the transmission module E1 is considered not to be full with respect to the processor, information designated I4, it stores the message to be transmitted on the network. However, if the transmission module E1 is considered to be full with respect to the processor, the latter must wait for the transmission module E1 to have adequate space in order to request therefrom the storage of the message. This transmission module E1 informs the cell C1 of its state, i.e. whether it is empty or not. This transmission module E1 consequently transmits informations to the cell C1, namely an information relative to its state (empty or not) I7, the message data item I5' and the address of the receiving processor of the message I6'.

The transmission module E1, like all the transmission modules of network, has a memory, whose size varies as a function of the transmission needs on the network, and a logic circuit which can be integrated with it. The logic circuit makes it possible to determine, on the basis of the number of informations received, the size of the messages and the capacity of the memory, whether it is empty or not, full or not.

It is pointed out that the transmission module E1 is considered as empty by the network if at least one complete message is not stored in it (information I12).

Such a transmission module makes it possible to significantly increase the efficiency of the network by saturating it. The module is controlled by message, which contributes to ensuring the consistency of the circulation and the reception of the messages in the network. Thus, said process of storing messages in the transmission module makes it possible to supply all the data items of a message in consecutive manner to the network, which ensures consistency.

The reception module R1 receives from the cell C1 the data item I8 to be stored, said item corresponding to the data item I3 when the message received from cell C0 by cell C1 is intended for the elementary processor P1 associated with the cell C1. Therefore the function of this reception module R1 is the storage of the message to be transmitted to the processor P1. With respect to the cell C1, it is considered as being full if it no longer has the space necessary for completely recording the message. It is considered as empty by the processor if at least one complete message can be stored. The reception module R1 transmits to the cell C1 an information I9 relative to its full or non-full state.

The reception module R1 also transmits to the elementary processor P1 the data items I8', as well as an information I10 relative to its state, i.e. an information for indicating to the processor that it is or is not empty. The reception module has a memory of varying size as a function of the requirements of the interconnection system and a logic circuit which can be integrated. The logic circuit makes it possible to determine, on the basis of the number of data items received, the size of the messages and the capacity of the memory, whether the reception module is full or not, empty or not. The module is controlled by message for the consistency reasons explained hereinbefore.

The previously described interconnection system implements the priority control process on transmitting messages. This process firstly consists, before the first despatch of messages to the network, of specifying the size of the messages which can be transmitted by a particular instruction requested by the programmer. The message size will then be identical throughout the same program cycle. As a function of this value, it is necessary to define the priority cells (i.e. the cells associated with priority processors) during the first despatch of messages on the network. For example, for a message instruction size equal to 2, message size=2, one cell out of two will be referred to as a priority cell. Only these priority cells will have the right to transmit during the first despatch of messages on the network. Even if the priority cells do not transmit a message, they generate a token. The non-priority cells eliminate the token if they have one. Thus, these cells are sure to transmit their first message in its entirety, because the preceding cell (or the preceding cells if the message size>2) will not transmit anything. Such a priority management on transmission makes it possible to regulate access conflicts to the network in the case of the passage of messages. The data of the same message thus follow in the cells of the network and could thus arrive consecutively in the reception module of the message receiving processor. Moreover, this priority management on transmission permits a circulation of several messages at the same time in the network without data becoming mixed.

The data of the messages to be transmitted are stored by the transmitting processor in the transmission module associated therewith, while awaiting permission for their despatch to the network. Following the first transmission phase, a certain number of tokens circulate in the network. Each cell detects whether the first data item of a message is intended for it by the presence of a token, by its own address and because the data item is valid (i.e. it has not yet been read). Thus, when a cell salvages the first data item or heading data item of a message sent to it, it can in turn transmit a new message, because the following data item are necessarily intended for it and consequently the cells which it needs are available. In the same way, if an already read data item (i.e. considered to be not valid) is accompanied by a token, the cell which receives it can transmit a message because this means that there has been no message in transit. A transmission of messages by a cell can only commence if the complete message is already stored in the transmission module.

Thus, each interconnection module or station is subject to a message management on transmission.

In order for a data item to be read by a cell, it is necessary for the heading data item to have already been salvaged. The cell then salvages the following data items until the cell reaches a not valid data item or a new message having a token. However, this salvaging of data is only possible if the reception module has adequate space for storing the complete message.

Therefore the interconnection module is subject to a management per message at the reception level, which means that the elements of the same message are not separated and consequently the data are consistent.

According to a variant of the invention, the definition of the priority cells (and therefore the processors associated therewith) is carried out by the actual processors during the first transmission of messages. These processors establish whether their number corresponds to a multiple of the previously specified message size and if the number of processors placed after them in the network exceeds the specified message size, which amounts to verifying the following equations:

$$(\text{NPE modulo TMESS})=0$$

$$(\text{N-NPE})\geq\text{TMESS}$$

with NPE between 0 and N−1 and in which NPE is the number of the current processor, i.e. the processor checking the two equations, N is the total number of processors connected to the network and TMESS the specified message size.

These two equations can be evaluated by a processor in less than about ten instructions. Moreover, when the programmer knows beforehand the different message sizes involved in the algorithms to be performed, by an initial phase he can carry out these calculations once and for all and can protect the results in the processor memory. During a message size change, it is sufficient for the processor to read the corresponding memory cell, position the token if it is of a priority nature and eliminate the token for the other processors.

According to another embodiment of the invention, this phase can be carried out by the previously described central control module.

FIG. 3A shows an embodiment of the state diagram of the transmission phase of a message. Thus, when a message has to be transmitted by a processor, the processing takes place in the following way. When the transmission module is ready to transmit (i.e. not empty), the cell checks whether it is in possession of a token. It also checks whether the data received are not valid. If it has a token, the data item received is not valid and the transmission module is not empty, then the cell transmits on the network the first data item (also called heading data item). It then calculates the value of the counter C0 from the expression C0=TMESS-1, in which TMESS is the specified message size. If this value of the counter C0 is zero (loop B1 in FIG. 3A), this means that there is only a single data item to be transmitted. Thus, the transmission module is considered as being again in its initial state. If the value of the counter C0 is not zero, then the cell emits the following data and calculates the value of the counter C0=C0−1. When the counter value is not zero (loop B2 in FIG. 3A), the cell transmits the following data. When the counter value becomes zero (loop B3 in FIG. 3A), the cell considers that all the data items of this message are supplied and the transmission module returns to its initial state.

According to another embodiment, a particular coding of non-usable cells is implemented during the definition of the priority cells, the cells verifying the inequation N−NPE<TMESS. The return to the initial state of the transmission module is detected by the arrival of either a token or such a cell. Thus, this embodiment does not require a counter C0.

FIG. 3B shows an embodiment of the state diagram of the message reception phase. When the reception module is not full, the cell checks whether the address field contained in the message corresponds to the number of the processor. The cell also checks the presence of a token, as well as the validity of the message. When these conditions have been proved, the cell recovers the data contained in the message intended for the processor with which it is associated. When the cell has not detected the presence of another token or the indication that the data item is not valid (loop B4 in FIG. 3B), it continues to recover the data items of the message and supply them to the reception module which stores them. If the cell detects the presence of another token or the presence of a not valid data item (loop B5 in FIG. 3B), then the cell considers that the message is finished and that the reception module can return to its initial state.

As has been made clear, the management of the priority on transmission implemented by this network makes it possible to ensure the consistency of the data items, while ensuring a good cell filling level during the shifting phase. Thus, such a network performs irregular communications between parallel structure processors (e.g. of the SIMD type) with a centralized control or management which, by its simplicity, makes it possible to connect a very large number of processors on the same network without necessarily involving increased equipment costs.

An application of this message control process in a ring network concerns the processing of images. For the processing of medium level images, the network must often centralize the characteristics of primitive or basic items extracted from images in order to form lists of attributes. In the case of an image or picture memory distributed on the processors, the processor which process their image part have a need to globalize the results. This can take place by allocating a basic item (e.g. the contour of an object, a spot, etc.) on the image with each processor. Thus, the processors must supply the attributes of the basic item which they have detected to the processor which takes charge thereof. It is consequently necessary to carry out exchanges, whose regularity is solely dependent on the image and which can have several data items per message (e.g. coordinates of the detected point on the abscissa and ordinate, grey level, etc.).

Another application of this process involves graphic generation, which consists, on the basis of a descriptive list, of calculating the characteristics and displaying the pixels forming part of the described basic item. It can e.g. be a question of plotting segments, filling surfaces, etc. As the memory is distributed over the processors, it is fundamental to have a network which can effectively pass the messages between individual processors. For the plotting of segments, the messages e.g. comprise the coordinates of the point, as well as the color thereof. Thus, if each processor calculates the pixels of a different segment, they are only able to plot the pixels belonging to their memory bank. They must consequently distribute the other pixels to other processors in order that the latter can plot them, i.e. store them in their own memory.

We claim:

1. Process for the control of messages circulating in a ring network of elementary processors (Po, . . . , Pn) organized in accordance with a parallel structure and able to process, per cycle, messages of the same size, each of these processors being associated with a respective interconnection module and connected to the network by the interconnection module, wherein a question of priorities of interconnection modules for transmission and for reception of messages is established by circulation of tokens in the network and one size of messages (TMESS) to be transmitted on the network is specified prior to a first transmission, the process comprising the steps of:

each elementary processor transmits a token if it verifies the equations:

(NPE modulo TMESS)=0 and (N−NPE)>TMESS, with NPE between 0 and N−1 and in which TMESS is the size of the messages to be transmitted, NPE is an elementary processor number in the network and N is the total number of elementary processors connected to the network;

when one of the interconnection modules receives a token, the interconnection module receives and acknowledges a first data item of a message to be received circulating in the network if the message is intended for the elementary processor associated with one of the interconnection modules;

determining whether the interconnection module has sufficient memory space for storing the message:
  using the interconnection module to return the message to the network if the memory space is inadequate for storing the message,
  using the interconnection module to store the first data item of the message and then all successive data items of the message until the interconnection module detects an end of the message if the memory space is adequate for storing the message; and using the elementary processor to check that the interconnection module has an adequate memory space for completely storing a message to be sent:

storing the message to be sent in the interconnection module if there is memory space for the message;

using the interconnection module to supply a first data item of the stored message to the network when the token is received and then all successive data items of the stored message if at least one message has been stored;

waiting until the interconnection module receives a following token if no message has been stored.

2. Interconnection system implementing the process according to claim 1, the system comprising:

a plurality of elementary processors (P0, . . . , Pn) able to perform synchronous processing operations, organized in accordance with a parallel structure and communicating with one another in a synchronous manner; and a plurality of interconnection modules, each interconnection module being associated with one of the elementary processors in order to ensure connection of the elementary processor to the network, each interconnection module comprising:

a cell (C0, . . . , Cn) connected to cells of adjacent modules and ensuring, when a token is present, reception of the first data item of the message circulating in the network and intended for the elementary processor with which the cell is associated and transmission of the message which the processor wishes to send to the network;

a reception module (R0, . . . , Rn) connected between the cell and the elementary processor and ensuring storage of complete messages received by the cell and intended for the elementary processor;

a transmission module (E0, . . . , En) connected between the elementary processor and the cell and ensuring storage of complete messages which the elementary processor wishes to send to the network.

3. Interconnection system according to claim 2, wherein each transmission module incorporates a memory able to store each of the messages to be transmitted and a logic circuit able to determine whether the memory is empty or not, or full or not.

4. Interconnection system according to claim 2, wherein each reception module incorporates a memory able to store each of the messages received and a logic circuit able to determine whether the memory is full or not, or empty or not.

5. Interconnection system according to claim 2, further comprising a central control module (MC) directly connected to each of the cells of the network in order to manage sequencing of the network.

6. Interconnection system according to claim 2, further comprising a central control module (MC) connected to each of the cells and connected to the network by means of a supplementary cell which initializes tokens at the start of a cycle.

* * * * *

UNITED STATES PATENT AND TRADEMARK OFFICE
CERTIFICATE OF CORRECTION

PATENT NO. : 5,574,931
DATED : November 12, 1996
INVENTOR(S) : Letellier et al.

It is certified that error appears in the above-indentified patent and that said Letters Patent is hereby corrected as shown below:

Column 7, line 44, after "The" insert --reception--.

Column 8, line 50, delete "(NPE modulo TMESS)-0" and insert --(NPE modulo TMESS)=0--.

Column 8, line 51, delete "(N-NPE)>TMESS" and insert --(N-NPE)≥TMESS--.

Column 9, line 66, delete "processor" and insert --processors--.

Signed and Sealed this

Fourth Day of March, 1997

Attest:

BRUCE LEHMAN

Attesting Officer    Commissioner of Patents and Trademarks